(12) United States Patent
Takayanagi

(10) Patent No.: US 6,186,846 B1
(45) Date of Patent: Feb. 13, 2001

(54) EXHAUST PASSAGE STRUCTURE FOR AN OUTBOARD MOTOR

(75) Inventor: Masashi Takayanagi, Hamamatsu (JP)

(73) Assignee: Suzuki Motor Corporation, Hamamatsu (JP)

(*) Notice: Under 35 U.S.C. 154(b), the term of this patent shall be extended for 0 days.

(21) Appl. No.: 09/522,821

(22) Filed: Mar. 10, 2000

(30) Foreign Application Priority Data

Mar. 11, 1999 (JP) .................................................. 11-065482

(51) Int. Cl.⁷ .................................................. B63H 21/32
(52) U.S. Cl. .................................................. 440/89
(58) Field of Search .................... 440/88, 89; 60/313; 123/195 P

(56) References Cited

U.S. PATENT DOCUMENTS

| 4,914,911 | * | 4/1990 | Bertram | 440/89 |
| 4,965,997 | * | 10/1990 | Suzuki et al. | 440/89 |
| 5,134,851 | * | 8/1992 | Davis | 440/89 |
| 5,494,467 | * | 2/1996 | Sohgawa et al. | 440/89 |
| 5,803,036 | * | 9/1998 | Takahashi et al. | 440/89 |

FOREIGN PATENT DOCUMENTS 4-134626   12/1992   (JP) .
06016187    1/1994   (JP) .

* cited by examiner

Primary Examiner—Stephen Avila
(74) Attorney, Agent, or Firm—Finnegan, Henderson, Farabow, Garrett & Dunner, L.L.P.

(57) ABSTRACT

An exhaust passage structure for an outboard motor is provided to prevent exhaust emission interference from occurring while employing a simple construction and without increasing the engine size. In an outboard motor 1 equipped with an engine 5 having a cylinder block 16 comprising a plurality of cylinders arranged in parallel to each other with an exhaust port 32 for each cylinder being formed in a cylinder head 15 that is joined with the cylinder block 16, exhaust passages 39 are formed in an exhaust manifold 25 for connecting each of the exhaust ports 32 and an exhaust discharge path 38 formed on the outboard motor 1 side, while all the exhaust passages 39 are joined after joining the exhaust passages 39-1 and 39-4 from the cylinders where combustion takes place in odd-numbered cycles and the exhaust passages 39-2 and 39-3 from the cylinders where combustion takes place in even-numbered cycles separately, with the exhaust passages 39 that are joined separately being disposed in parallel to each other in the longitudinal direction of the outboard motor 1.

11 Claims, 5 Drawing Sheets

EXHAUST PASSAGE STRUCTURE FOR AN OUTBOARD MOTOR

BACKGROUND OF THE INVENTION

1. Field of the Invention

The present invention relates to an exhaust passage structure for an outboard motor.

2. Description of the Related Art Among engines for outboard motors, there is one that has a cylinder block comprising a plurality of cylinders arranged vertically. A cylinder head joined with the cylinder block has an intake port and an exhaust port being formed for each of the cylinders. Exhaust gas from each exhaust port is collected into a common exhaust passage, and is discharged out of the outboard motor.

A conventional means for collecting the exhaust gas discharged from each of the exhaust ports, for example, is disclosed in Japanese Laid-open Patent Publication No. Hei-6-16187, wherein the exhaust passages communicating to the exhaust ports in the cylinder head are formed integrally in the cylinder block. Another typical means for collecting exhaust gas discharged from respective exhaust ports is disclosed in Japanese Laid-open Utility Model Application No. Hei-4-134626, wherein a separate exhaust manifold is disposed between a cylinder head and an oil pan having exhaust passages formed therein.

However, forming the exhaust passages integrally in the cylinder block increases the size and weight of the cylinder block, and makes the configuration more complicated, thus leading to higher manufacturing cost. Also, since the exhaust passages are formed in greater proximity to the cylinder, the cylinder may be subjected to thermal deformation due to exhaust heat which should be avoided. Moreover, since the cylinder and the exhaust passage use a common coolant water jacket, it is impossible to control the temperature of the exhaust passage independently, thus resulting in lower cooling efficiency of the exhaust passage.

Although these problems may be solved by using an exhaust manifold, it is difficult to control the accuracy of assembly unless the top end and bottom end of the exhaust manifold lie on the same plane. Consequently, there may occur such undesirable effects as a lower yield in the machining processes.

In the case of a four-cylinder engine, for example, exhaust passages are arranged in such an order in the exhaust manifold where cylinder No. 1 may be at the top, followed by No. 2, No. 3, and No. 4, downward, while combustion in a four-cycle, four-cylinder engine generally occurs in the order of cylinder No. 1, No. 3, No. 4, and No. 2. As a result, exhaust emission interference occurs when the exhaust passages from cylinders No. 3 and No. 4, where combustion occurs consecutively are disposed adjacent to each other, and the exhaust passages from cylinders No. 2 and No. 1, where combustion occurs consecutively are disposed adjacent to each other, thus giving rise to a possibility of lowering engine performance.

Although these problems, for example, may be solved by a method extending the exhaust passages to below the engine and joining them at this position as disclosed in Japanese Laid-open Patent Publication No. Hei-9-49425, this makes the exhaust passages too long, resulting in a large size of the engine. Also the number of component parts increases and the construction becomes complex, while making it difficult to form the coolant water jacket and the coolant water passage.

SUMMARY OF THE INVENTION

The advantages and purposes of the invention will be set forth in part in the description which follows, and in part will be obvious from the description, or may be learned by practice of the invention. Moreover, the advantages and purposes of the invention will be realized and attained by means of the elements and combinations particularly pointed out in the appended claims.

The present invention is made in consideration of the above-mentioned problems, and an exemplary object thereof is to provide an exhaust passage structure for an outboard motor that makes it possible to prevent exhaust emission interference from occurring with a simple configuration without increasing the engine size.

Another exemplary object of the present invention is to provide an exhaust passage structure for an outboard motor that simplifies the configuration of component parts of the engine and of the exhaust manifold, while improving the productivity of these component parts.

A further exemplary object of the present invention is to provide an exhaust passage structure for an outboard motor that improves the cooling performance of the exhaust passages.

In order to solve the problems described above, an embodiment of the present invention provides an exhaust passage structure for an outboard motor that is equipped with an engine having a cylinder block comprising a plurality of cylinders arranged in parallel to each other, with an exhaust port for each of the cylinders being formed in a cylinder head that is joined with the cylinder block, wherein exhaust passages are formed in an exhaust manifold for connecting the exhaust ports and an exhaust discharge path formed on the outboard motor side, while all the exhaust passages are joined after separating joining the exhaust passages from the cylinders where combustion takes place in odd-numbered cycles and the exhaust passages from the cylinders where combustion takes place in even-numbered cycles, with the exhaust passages that are joined separately being disposed in parallel to each other in the longitudinal direction of the outboard motor.

To further solve the problems described above, one exemplary embodiment of the present invention includes joining all of the exhaust passages in the exhaust manifold before the exhaust discharge path.

Moreover, another embodiment of the present invention includes providing the exhaust manifold separately from the cylinder block and the cylinder head.

Yet another embodiment of the present invention includes a joining surface of the exhaust manifold with the engine is formed in a single plane.

A further embodiment of the present invention includes a water inlet provided in the outboard motor with such a configuration so that coolant water for cooling the exhaust passages of the exhaust manifold is introduced through a point midway in a coolant water passage running from the water inlet to the engine.

The above and other objects, features and advantages of the present invention will become apparent from the following description of a preferred embodiment taken in conjunction with the accompanying drawings.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention illustrated in the accompanying drawings. Wherever possible, the same reference numbers are used throughout the drawings to refer to the same or like parts.

Figure 1:
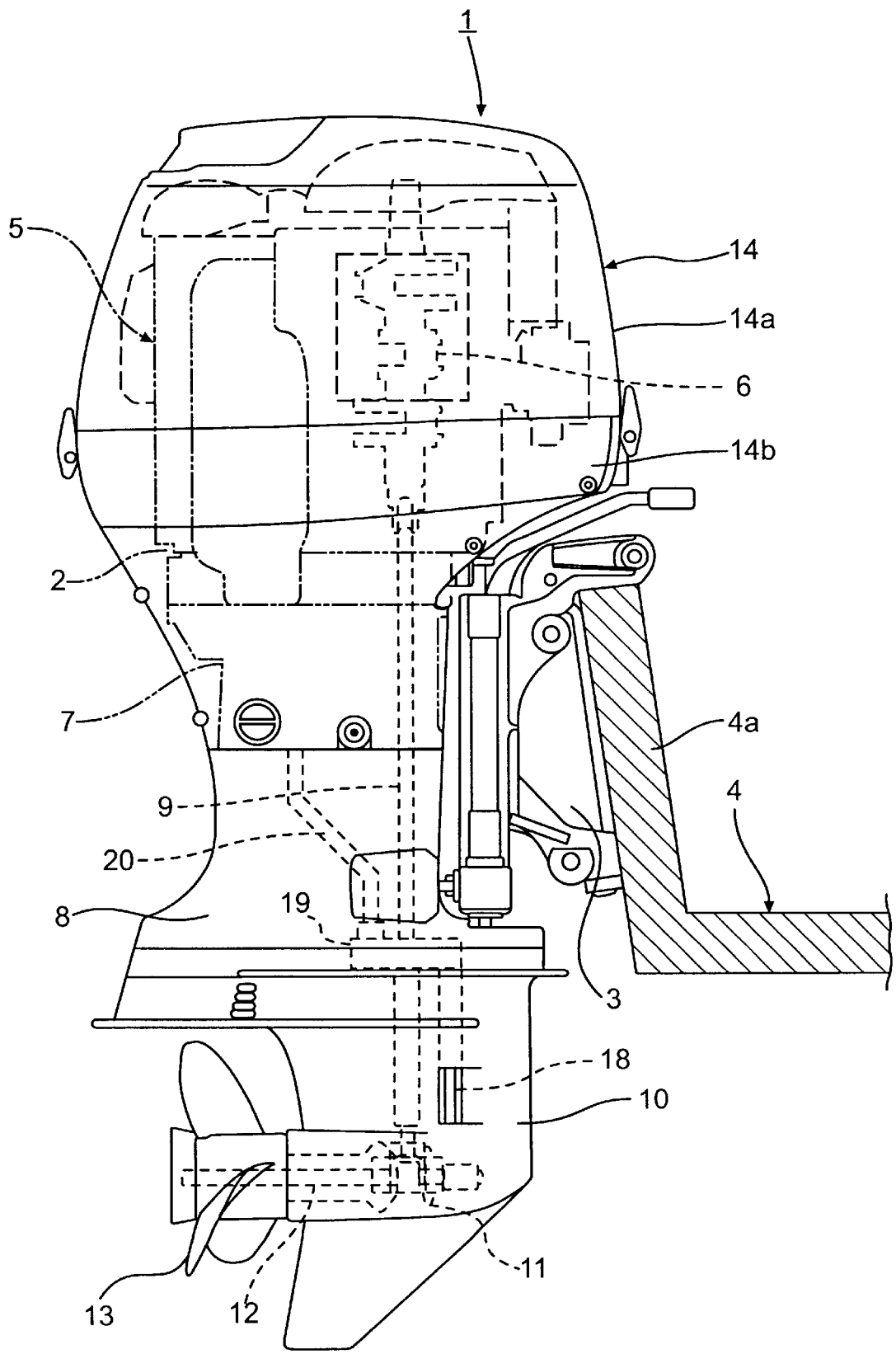
FIG. 1 is a right side elevational view of an outboard motor according to an embodiment of the exhaust passage structure for an outboard motor of the present invention.

As illustrated in FIG. 1, outboard motor 1 is provided with an engine holder 2 and is mounted on a transom 4a of the hull of a boat 4 via a bracket 3 attached to the engine holder 2. An engine 5 is mounted on an upper portion of the engine holder 2.

The engine 5 is provided with a crank shaft 6 installed in a substantially vertical orientation. Mounted on a lower portion of the engine holder 2 is a shaft housing 8 being separated by an oil pan 7.

Installed to extend downward through the oil pan 7 and the shaft housing 8 is a drive shaft 9 connected to the lower end of the crank shaft 6, thereby to drive a propeller 13 via a bevel gear 11 in a gear case 10 installed in the lower portion of the shaft housing 8 and via the propeller shaft 12.

The engine 5 is enclosed by an engine cover 14. The engine cover 14 can be separated into an upper cover 14a and a lower cover 14b, while the lower cover 14b can be further separated into left and right parts. The engine holder 2, the oil pan 7 and a lower portion of the engine 5 are enclosed by the lower cover 14b and an upper portion of the engine 5 is enclosed by the upper cover 14a.

Figure 2:
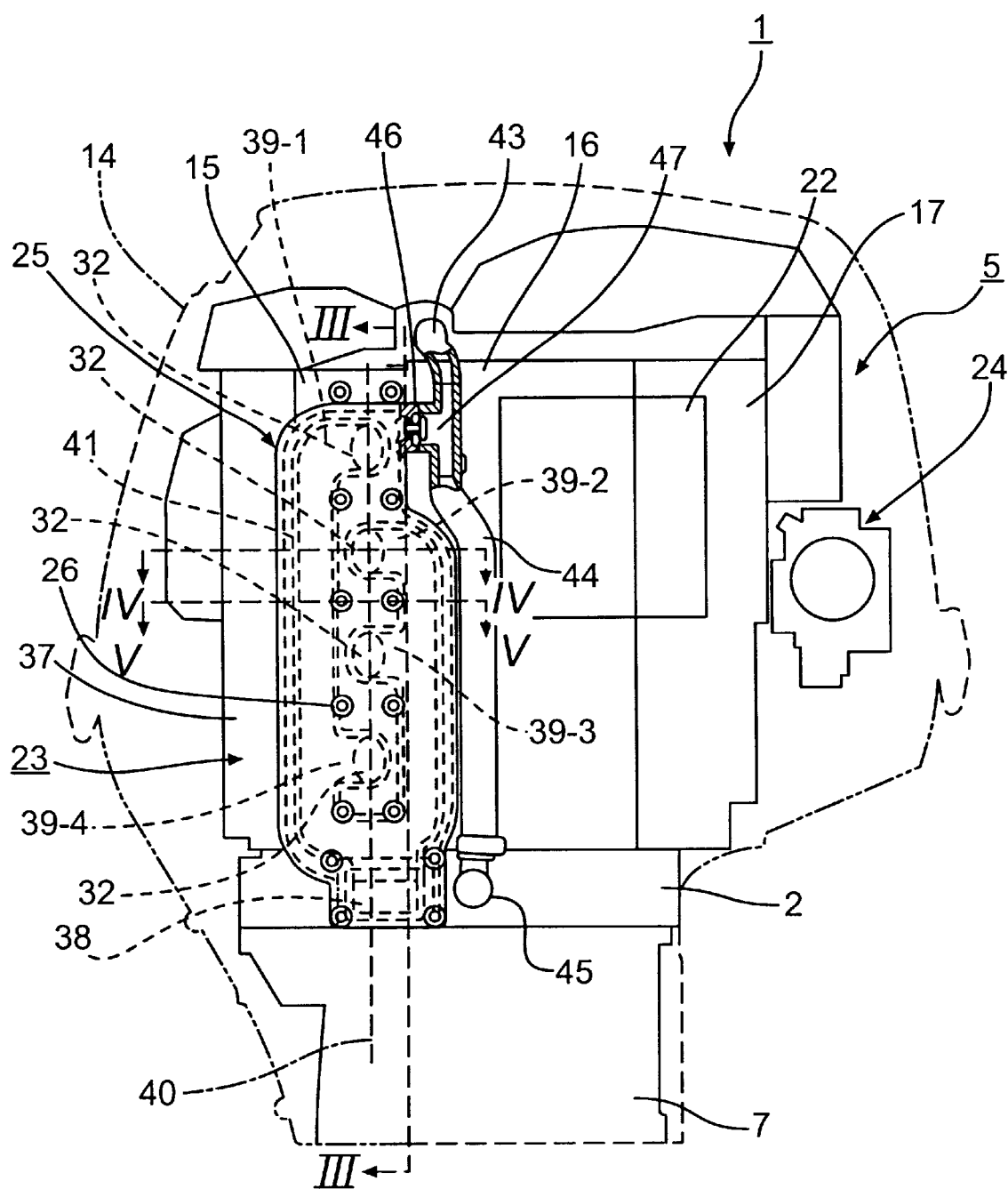
FIG. 2 shows the engine portion of FIG. 1 enlarged in a substantially right side elevational view.
Figure 3:
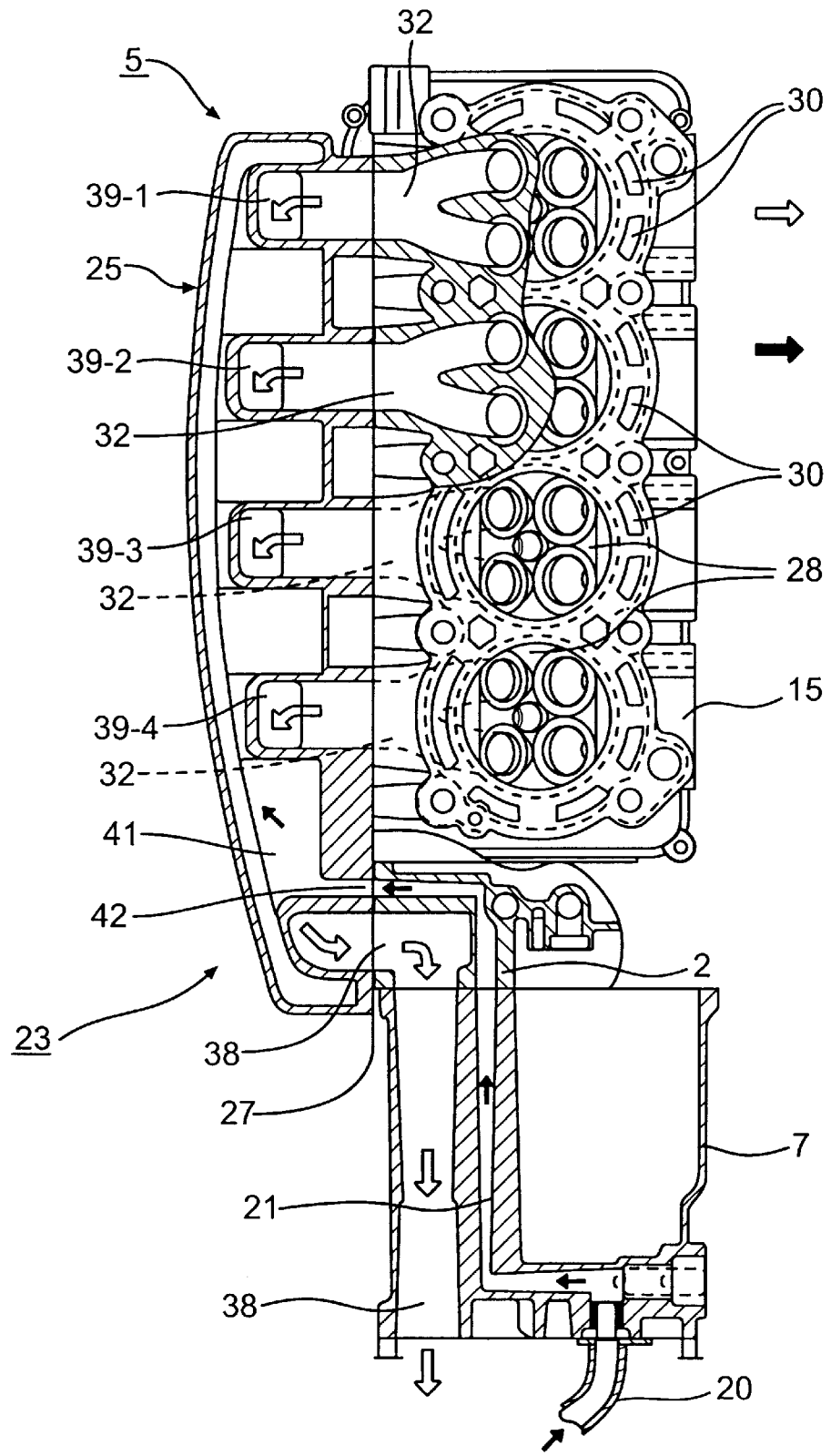
FIG. 3 is a sectional view along lines III—III of FIG. 2.
Figure 4:
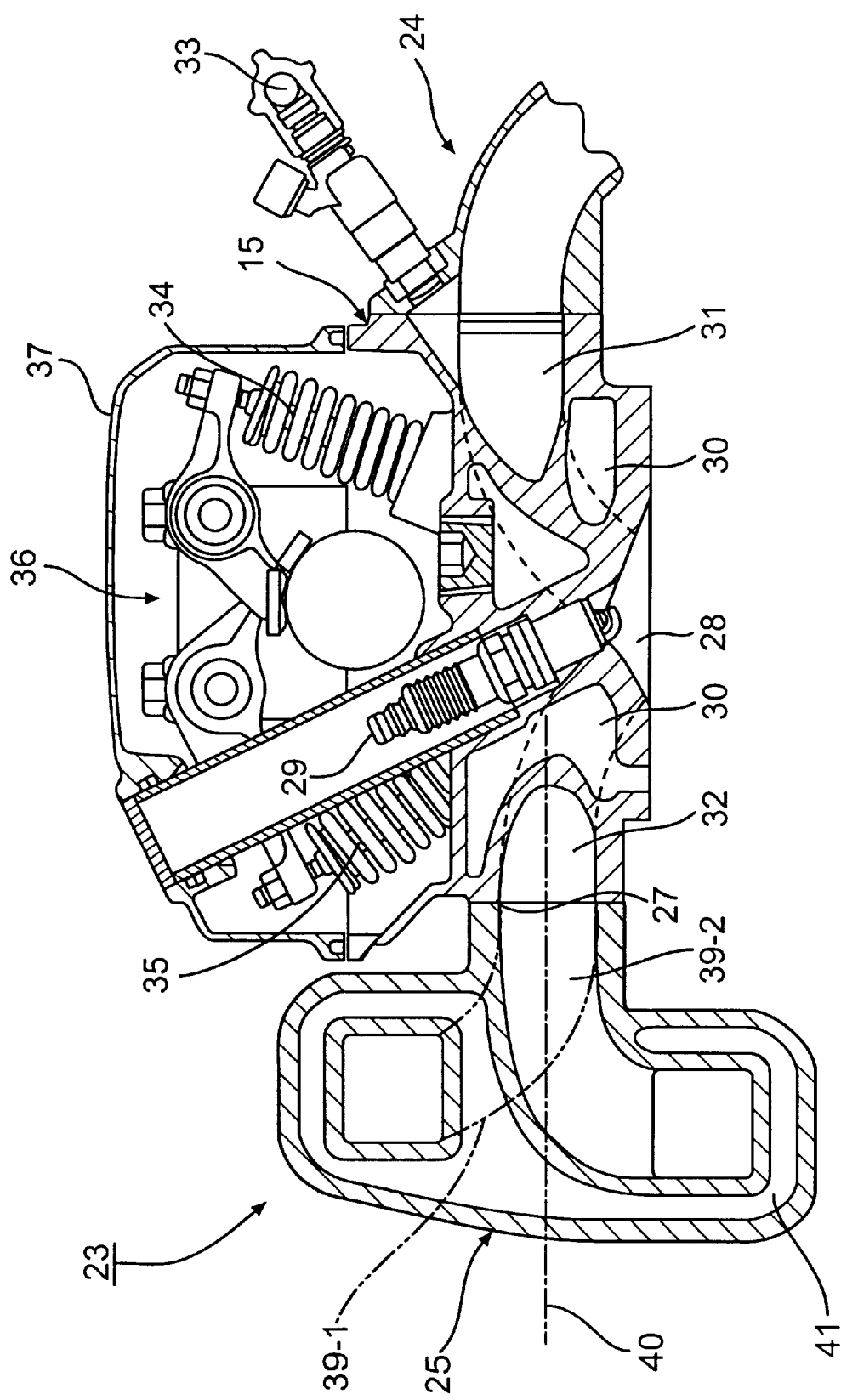
FIG. 4 is a sectional view along lines IV—IV of FIG. 2.
Figure 5:
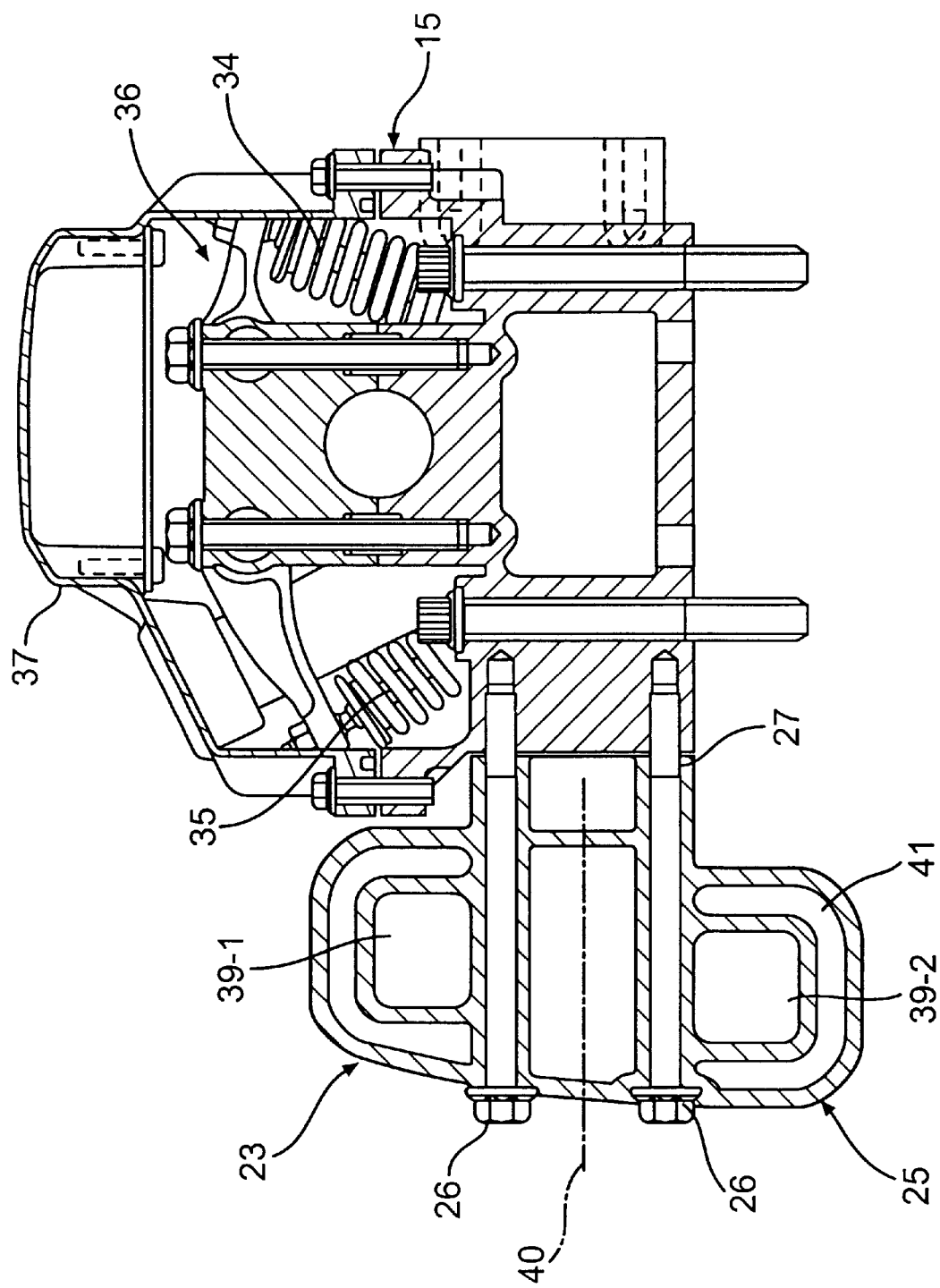
FIG. 5 is a sectional view along lines V—V of FIG. 2.

As shown in FIG. 2, which illustrates engine cover 14 via a imaginary line, the engine 5 is a four-cycle, four-cylinder engine, for example, constituted from a cylinder head 15, a cylinder block 16, a crank case 17, etc., being arranged in the longitudinal direction of the outboard motor 1. The engine 5 of the outboard motor 1 is cooled by water using sea water, for example, introduced through the water inlet 18 provided in the gear case 10 as coolant water for the engine 5, as shown for example in FIGS. 1 and 3. The coolant water is introduced through the water inlet 18 by a water pump 19 driven by the drive shaft, guided through a water supply pipe 20 into a coolant water passage 21 installed in the oil pan 7 and in the engine holder 2, and is introduced into the engine 5 through the coolant water passage 21, although not shown in detail in the drawings.

Installed around the engine 5 are electric parts 22, an exhaust system 23, an intake system 24 and the like. The intake system 24 is installed to be concentrated in an area extending from the left side (not shown) to the front, (see right-hand side of FIG. 2) of the engine 5, while the exhaust system 23 is disposed on the right side of the engine 5 and the electric parts 22 are also disposed on the right side of the engine 5 similar to the exhaust system 23.

The exhaust system 23 has an exhaust manifold 25 that is separate from the engine 5, the exhaust manifold 25 being disposed to span over a side face of the cylinder head 15 and a side face of the engine holder 2, and fastened by, for example, bolts 26. Joining surface 27 of the exhaust manifold 25 with the cylinder head 15 and with the engine holder 2 are formed in a single plane.

The cylinder block 16 of the engine 5 comprises cylinders not shown in the drawings formed therein. The cylinder head 15 has combustion chambers 28, that match the cylinders, being formed therein with spark plugs 29 being connected thereto from the outside. Formed to surround the cylinders in the cylinder block 16 are water jackets not shown in the drawing. A water jacket 30 is also formed around the combustion chambers 28 of the cylinder head 15. The coolant water passage 21 is connected to these water jackets 30.

Formed in the cylinder head 15 are intake port 31 and an exhaust port 32 that communicate with the combustion chambers 28. The cylinder head 15 is provided with a fuel injector 33 installed from the outside thereto for injecting fuel into the intake port 31. Disposed in the cylinder head 15 is a valve train 36 for the intake valves 34 and the exhaust valves 35 that open and close the ports 31 and 32. The valve train 36 provided in the cylinder head 15 is enclosed by a head cover 37.

Formed in the exhaust manifold 25 are exhaust passages 39 that connect each exhaust port 32 of the cylinder block 16 and the exhaust discharge path 38 formed in the engine holder 2 and in the oil pan 7. The exhaust passages 39 extend from each exhaust port 32 and are joined in the exhaust manifold 25 to connect to the exhaust discharge path 38 formed in the engine holder 2 and in the oil pan 7.

Combustion in the cylinders of the four-cycle, four-cylinder engine 5 mounted in the outboard motor 1 takes place, for example, in the order of the cylinder No. 1, No. 3, No. 4 and No. 2, assuming that the one located at the top is cylinder No. 1. The exhaust passages 39 from the cylinders that experience combustion in odd-numbered cycles, namely the exhaust passages 39-1 and 39-4 from the cylinders No. 1 and No. 4 in this embodiment, and the exhaust passages 39 from the cylinders that experience combustion in even numbered cycles, namely the exhaust passages 39-2 and 39-3 from the cylinders No. 2 and No. 3 in this embodiment, are joined separately, and then finally combined in the exhaust manifold 25 before the exhaust discharge path 38 of the engine holder 2.

Also the exhaust passages 39-1 and 39-4 from the cylinders No. 1 and No. 4 and the exhaust passages 39-2 and 39-3 from the cylinders No. 2 and No. 3 are disposed in parallel to each other in the longitudinal direction of the outboard motor 1. In this embodiment, the exhaust passages 39-1 and 39-4 from the cylinders No.1 and No. 4 are disposed on the head cover 37 side of a line 40 that connects the centers of each exhaust port 32, while the exhaust passages 39-2 and 39-3 from the cylinders No. 2 and No. 3 are disposed on the crank case 17 side of the line 40.

Meanwhile, a water jacket 41 for cooling the exhaust passages 39 is also formed around the exhaust passages 39 formed in the exhaust manifold 25. A coolant inlet 42 is provided in the joining surface 27 between the cylinder head 15 below the exhaust manifold 25 and the engine holder 2, and is connected to the coolant water passage 21 formed in the engine holder 2.

A coolant water outlet 43 of the water jacket 30 formed in the cylinder block 16 and in the cylinder head 15 is located, for example, above the cylinder block 16, while a water discharge hose 44 connected to the coolant water outlet 43 extends downward and is connected to a water discharge passage 45 formed in the engine holder 2. Also, a coolant water outlet 46 of the water jacket 41 of the exhaust manifold 25 is disposed above the exhaust manifold 25, with the coolant water outlet 46 being connected to the water discharge hose 44 midway thereof.

Installed at the coolant water outlet 46 of the water jacket 41 formed in the exhaust manifold 25 is a pressure valve 47 so that, when the coolant water pressure in the water jacket 41 rises above a predetermined pressure value, the pressure valve 47 opens to discharge the coolant water through the water discharge hose 44, thereby maintaining a constant coolant water pressure in the water jacket 41.

The operation of the preferred embodiments of the present invention will not be described.

Since all the exhaust passages 39 are joined after separately joining the exhaust passages 39-1 and 39-4 from the cylinders where combustion takes place in odd-numbered cycles and the exhaust passages 39-2 and 39-3 from the cylinders where combustion takes place in even-numbered cycles, it is made possible to prevent exhaust emission interference from occurring between the cylinders that experience combustion consecutively, thus improving the performance of the engine 5.

Moreover, by disposing the exhaust passages 39, which have been joined separately in parallel to each other in the longitudinal direction of the outboard motor 1, the engine 5 can be made small in size.

Also, by finally joining all of the exhaust passages 39 in the exhaust manifold 25 before the exhaust discharge path 38 of the engine holder 2, it is made unnecessary to form many exhaust passages 39 in the engine holder 2 and in the oil pan 7, thus simplifying the configuration resulting in an improved productivity and making it possible to reduce the size of the engine 5 as a whole. Additionally, despite the simplified configuration of the exhaust manifold 25, functions comparable to those of the prior art can be achieved.

Furthermore, by providing the exhaust manifold 25 separately from the cylinder block 16 and the cylinder head 15 of the engine 5, it is made possible to simplify the configurations of the cylinder block 16, the cylinder head 15 and the exhaust manifold 25 while the exhaust manifold 25 of simple configuration allows the large-capacity water jacket 41 to be formed therein.

In addition, since the joining surfaces 27 of the exhaust manifold 25 of the engine 5, that is, the cylinder head 15 and the engine holder 2, are formed on a single plane, machining of the joining surface 27 becomes easier resulting in an improved productivity, and sealing of the exhaust manifold 25 with the cylinder head 15 and the engine holder 2 is improved.

Lastly, by introducing the coolant water for cooling the exhaust passages 39 provided in the exhaust manifold 25 from a point of the coolant water passage 21 located in the engine holder 2 between the water intake port 18 and the engine 5, it is made possible to utilize the coolant water of low temperature and improve the performance of cooling the exhaust passage 39.

According to the exhaust passage structure for an outboard motor of the present invention, as described above, in the outboard motor equipped with an engine having a cylinder block comprising a plurality of cylinders arranged in parallel to each other with the exhaust port for each cylinder being formed in the cylinder head that is joined with the cylinder block, since the exhaust passages are formed in the exhaust manifold for connecting the exhaust ports and the exhaust discharge path formed on the outboard motor side while all the exhaust passages are joined after joining the exhaust passages from the cylinders where combustion takes place in odd-numbered cycles and the exhaust passages from the cylinders where combustion takes place in even-numbered cycles separately, with the exhaust passages that are joined separately being disposed in parallel to each other in the longitudinal direction of the outboard motor, it is made possible to prevent exhaust emission interference from occurring between the cylinders that experience combustion consecutively and make the engine size smaller.

Also, since all of the exhaust passages are finally joined in the exhaust manifold before the exhaust discharge path, productivity for the engine component parts is improved and the engine is made compact.

Further, since the exhaust manifold is provided separately from the cylinder block and the cylinder head, configuration of the engine component parts can be simplified and a water jacket of a large capacity can be formed in the exhaust manifold.

Moreover, since the joining surfaces of the exhaust manifold with the engine are formed on a single plane, machining of the joining surfaces between the engine component parts becomes easier resulting in an improved productivity, and sealing between the engine component parts is also improved.

In addition, since the water inlet is provided in the outboard motor and such a configuration is employed as coolant water for cooling the exhaust passages of the exhaust manifold is introduced through a point midway in the coolant water passage running from the water inlet to the engine, performance of cooling the exhaust passages can be improved by using coolant water of a low temperature.

Other embodiments of the invention will be apparent to those skilled in the art from consideration of the specification and practice of the invention disclosed herein. It is is intended that the specification and examples be considered as exemplary only. Thus, it should be understood that the invention is not limited to the illustrative examples in this specification. Rather, the invention is intended to cover all modifications and variations that come within the scope of the following claims and their equivalents.

What is claimed is:

1. An exhaust passage structure for an outboard motor equipped with an engine having a cylinder block comprising:

a plurality of cylinders arranged in a line, with an exhaust port for each cylinder being formed in a cylinder head that is joined with the cylinder block;

a plurality of exhaust passages formed in an exhaust manifold for connecting each exhaust port and an exhaust discharge path formed on a side of the outboard motor, the plurality of exhaust passages including first and second exhaust passages for respective first and second cylinders in which combustion takes place in odd-numbered cycles, and third and fourth exhaust passages for respective third and fourth cylinders in which combustion takes place in even-number cycles; and wherein the plurality of exhaust passages are joined before the first and second exhaust passages are separately joined so that the first and second exhaust passages are disposed in parallel to each other relative to a longitudinal direction of the outboard motor.

2. An exhaust passage structure for an outboard motor according to claim 1, wherein each of the plurality of exhaust passages are finally joined in said exhaust manifold before said exhaust discharge path.

3. An exhaust passage structure for an outboard motor according to claim 1, wherein the exhaust manifold is provided separately from said cylinder block and said cylinder head.

4. An exhaust passage structure for an outboard motor according to claim 2, wherein the exhaust manifold is provided separately from said cylinder block and said cylinder head.

5. An exhaust passage structure for an outboard motor according to claim 1, wherein a joining surface of said exhaust manifold with said engine is formed in a single plane.

6. An exhaust passage structure for an outboard motor according to claim 2, wherein a joining surface of said exhaust manifold with said engine is formed in a single plane.

7. An exhaust passage structure for an outboard motor according to claim 3, wherein a joining surface of said exhaust manifold with said engine is formed in a single plane.

8. An exhaust passage structure for an outboard motor according to claim 1, wherein a water inlet is provided in said outboard motor, so that coolant water for cooling said exhaust passages of said exhaust manifold is introduced through a point midway in a coolant water passage running from the water inlet to said engine.

9. An exhaust passage structure for an outboard motor according to claim 2, wherein a water inlet is provided in said outboard motor, so that coolant water for cooling said exhaust passages of said exhaust manifold is introduced through a point midway in a coolant water passage running from the water inlet to said engine.

10. An exhaust passage structure for an outboard motor according to claim 3, wherein a water inlet is provided in said outboard motor, so that coolant water for cooling said exhaust passages of said exhaust manifold is introduced through a point midway in a coolant water passage running from the water inlet to said engine.

11. An exhaust passage structure for an outboard motor according to claim 4, wherein a water inlet is provided in said outboard motor, so that coolant water for cooling said exhaust passages of said exhaust manifold is introduced through a point midway in a coolant water passage running from the water inlet to said engine.

* * * * *